US012413901B2

(12) United States Patent
Nakamura et al.

(10) Patent No.: US 12,413,901 B2
(45) Date of Patent: Sep. 9, 2025

(54) HIGH-PERFORMANCE AND FLEXIBLE LOUDSPEAKER APPARATUS USABLE IN VARIOUS SCENES

(71) Applicant: CANON DENSHI KABUSHIKI KAISHA, Saitama (JP)

(72) Inventors: Hiroyuki Nakamura, Tokyo (JP); Minoru Tsuruta, Chichibu (JP); Yoshihito Yamada, Honjo (JP); Takao Kakizakai, Chichibu (JP)

(73) Assignee: CANON DENSHI KABUSHIKI KAISHA, Saitama (JP)

( * ) Notice: Subject to any disclaimer, the term of this patent is extended or adjusted under 35 U.S.C. 154(b) by 404 days.

(21) Appl. No.: 18/067,167

(22) Filed: Dec. 16, 2022

(65) Prior Publication Data

US 2023/0209248 A1 Jun. 29, 2023

(30) Foreign Application Priority Data

Dec. 24, 2021 (JP) ................................ 2021-211330
Aug. 5, 2022 (JP) ................................ 2022-125555
Aug. 5, 2022 (JP) ................................ 2022-125556
Nov. 29, 2022 (JP) ................................ 2022-190372

(51) Int. Cl.
*H04R 1/28* (2006.01)
*H04R 1/34* (2006.01)

(52) U.S. Cl.
CPC .......... *H04R 1/2834* (2013.01); *H04R 1/288* (2013.01); *H04R 1/2896* (2013.01); *H04R 1/345* (2013.01); *H04R 2400/11* (2013.01); *H04R 2420/07* (2013.01)

(58) Field of Classification Search
CPC ........ H04R 1/2834; H04R 1/283; H04R 1/34; H04R 1/345; H04R 1/2896; H04R 2400/11; H04R 2420/07
See application file for complete search history.

(56) References Cited

U.S. PATENT DOCUMENTS 7,573,302 B2 8/2009 Nakamura
7,902,906 B2 3/2011 Nakamura
9,917,415 B2 3/2018 Nakamura
10,306,356 B2 * 5/2019 Katz ..................... H04R 1/345
2004/0020711 A1 2/2004 China (Continued)

FOREIGN PATENT DOCUMENTS

JP 2004-72140 A 3/2004
JP 3841759 B2 11/2006
JP 6503651 B2 4/2019

*Primary Examiner* — Vivian C Chin
*Assistant Examiner* — Annabelle Kang
(74) *Attorney, Agent, or Firm* — VENABLE LLP

(57) ABSTRACT

A high-performance and flexible loudspeaker apparatus usable in various scenes. A first unit includes a loudspeaker therein, a second unit is connected to a lower portion of the first unit, the first unit comprises the loudspeaker provided in a housing of the first unit so as to output a sound toward an upper portion of the housing and a passive radiator provided on a rear surface side of the loudspeaker in the housing, and an output port of the passive radiator is opposed to an inclined surface which is provided at an upper portion of the second unit and whose distance from the output port of the passive radiator increases toward a radially outer side of the housing.

8 Claims, 17 Drawing Sheets

(56) References Cited

U.S. PATENT DOCUMENTS

| | | | | |
|---|---|---|---|---|
| 2016/0080845 | A1* | 3/2016 | Williams ................. | H04R 1/28<br>381/386 |
| 2017/0332166 | A1* | 11/2017 | Kikuchi ................. | H04R 1/025 |

* cited by examiner

HIGH-PERFORMANCE AND FLEXIBLE LOUDSPEAKER APPARATUS USABLE IN VARIOUS SCENES

BACKGROUND OF THE INVENTION

Field of the Invention

The present invention relates to a loudspeaker apparatus such as a portable wireless loudspeaker.

Description of the Related Art

In recent years, there has been proposed a wireless loudspeaker in which a lighting apparatus is built in an omnidirectional wireless loudspeaker emitting a sound in 360-degree directions to express emotionality of music by means of dim light or to change the light volume along with music (refer to, for example, Japanese Laid-Open Patent Publication (kokai) No. 2016-19129).

Each of the aforementioned conventional wireless loudspeakers is not intended to be used as a spotlight for illuminating the food or the like on the table, or used when the user reads or works at the desk. However, it is also conceivable that the loudspeaker is usable by increasing the light volume not only as a wireless loudspeaker but also as a lighting device at the time of reading or the like.

Meanwhile, since the conventional wireless loudspeaker includes a low tone loudspeaker and a passive radiator on the bottom surface of the apparatus, there is a problem in which sound vibration may be transmitted to the stand such as a desk to generate a chattering sound, which may affect the sound quality.

SUMMARY OF THE INVENTION

The present invention provides a high-performance and flexible loudspeaker apparatus usable in various scenes.

Accordingly, the present invention provides a loudspeaker apparatus comprising a first unit including a loudspeaker therein, and a second unit connected to a lower portion of the first unit, the first unit comprising the loudspeaker provided in a housing of the first unit so as to output a sound toward an upper portion of the housing and a passive radiator provided on a rear surface side of the loudspeaker in the housing, an output port of the passive radiator being opposed to an inclined surface which is provided at an upper portion of the second unit and whose distance from the output port of the passive radiator increases toward a radially outer side of the housing.

According to the present invention, it is possible to provide a loudspeaker apparatus with excellent sound quality that suppresses deterioration in sound quality caused by transmission of sound vibration to the stand such as a desk.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

First Embodiment

First, a lighting-equipped loudspeaker 1 according to the present embodiment will be described with reference to FIGS. 1A to 5B. It should be noted that, as the lighting-equipped loudspeaker according to the present embodiment, a loudspeaker with a size of being usable on a table, a desk, or the like will be assumed, but the present invention is not limited thereto. For example, the lighting-equipped loudspeaker may be one usable by being connected to an instrument or the like in a live music club, an event venue, or the like.

Figures 1A, 1B, 1C, 1D:
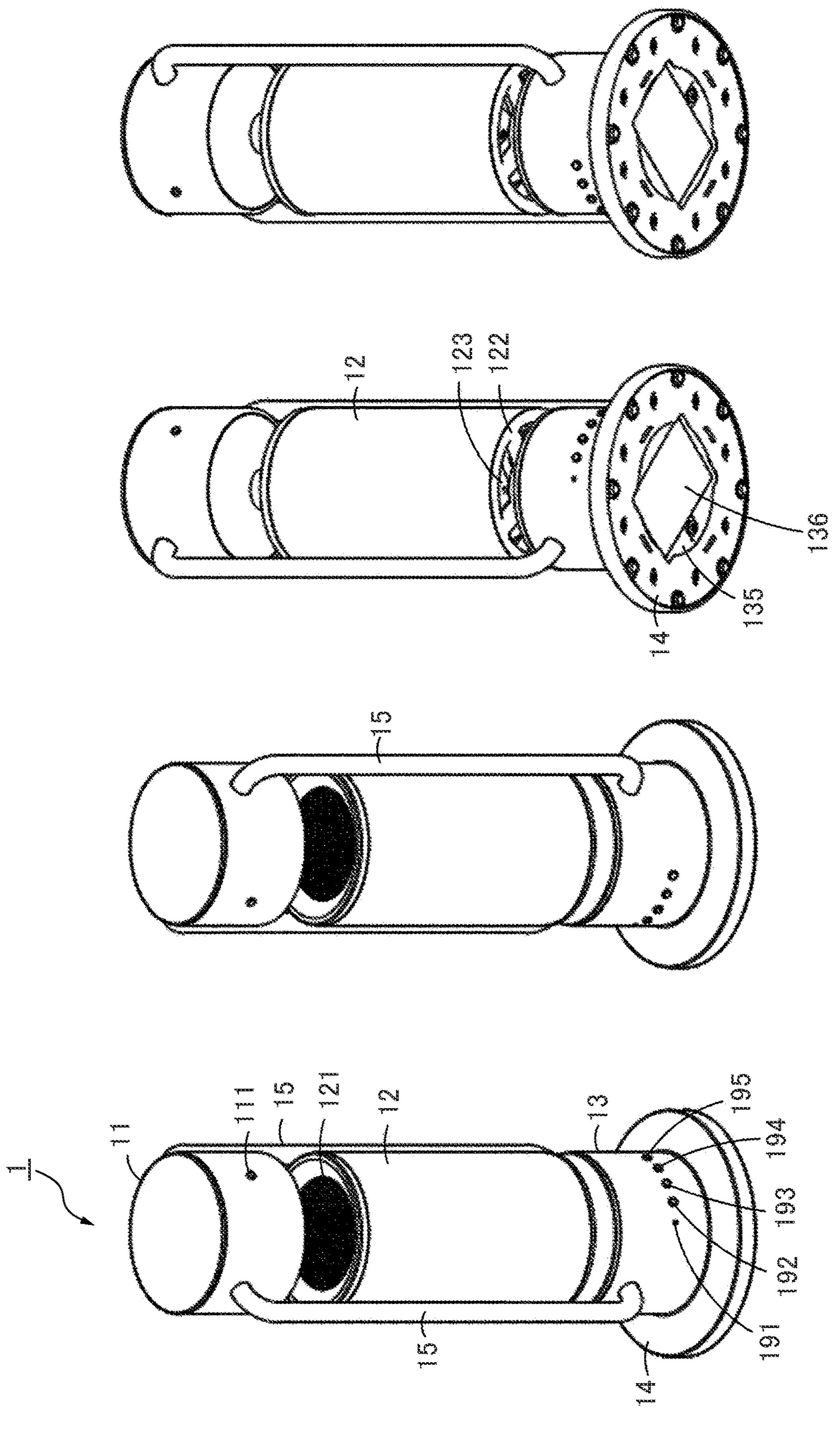
FIGS. 1A to 1D are perspective views showing an example of a lighting-equipped loudspeaker according to a first embodiment of the present invention.

FIGS. 1A to 1D are perspective views showing an example of a lighting-equipped loudspeaker showing an embodiment of the present invention. FIG. 1A is a perspective view of the lighting-equipped loudspeaker as viewed diagonally from the upper left, FIG. 1B is a perspective view of the lighting-equipped loudspeaker as viewed diagonally from the upper right, FIG. 1C is a perspective view of the lighting-equipped loudspeaker as viewed diagonally from the lower left, and FIG. 1D is a perspective view of the lighting-equipped loudspeaker as viewed diagonally from the lower right.

Figure 2E:
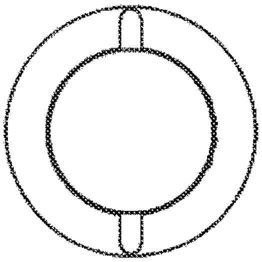
FIGS. 2A to 2F are six-sided views showing the example of the lighting-equipped loudspeaker according to the first embodiment.
Figure 2F:
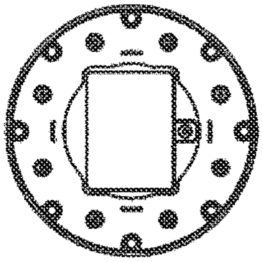
Figure 2D:
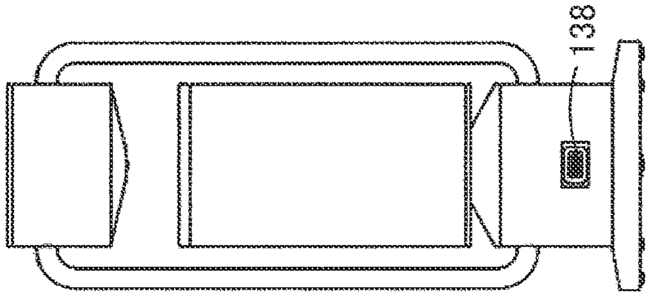
Figure 2C:
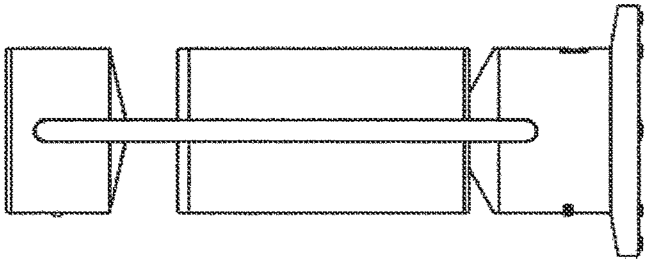
Figure 2B:
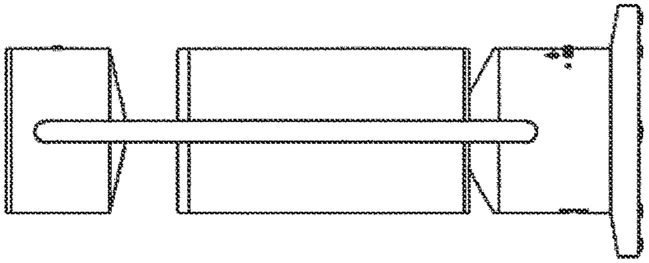
Figure 2A:
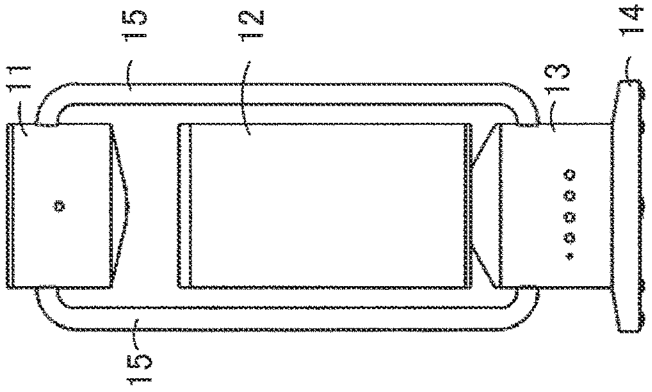

FIGS. 2A to 2F are six-side views showing the example of the lighting-equipped loudspeaker according to the present embodiment. In FIG. 2, FIG. 2A is a front view of the lighting-equipped loudspeaker, FIG. 2B is a left side view of the lighting-equipped loudspeaker, FIG. 2C is a right side view of the lighting-equipped loudspeaker, FIG. 2D is a rear view of the lighting-equipped loudspeaker, FIG. 2E is a plan view of the lighting-equipped loudspeaker, and FIG. 2F is a bottom view of the lighting-equipped loudspeaker.

Figure 3:
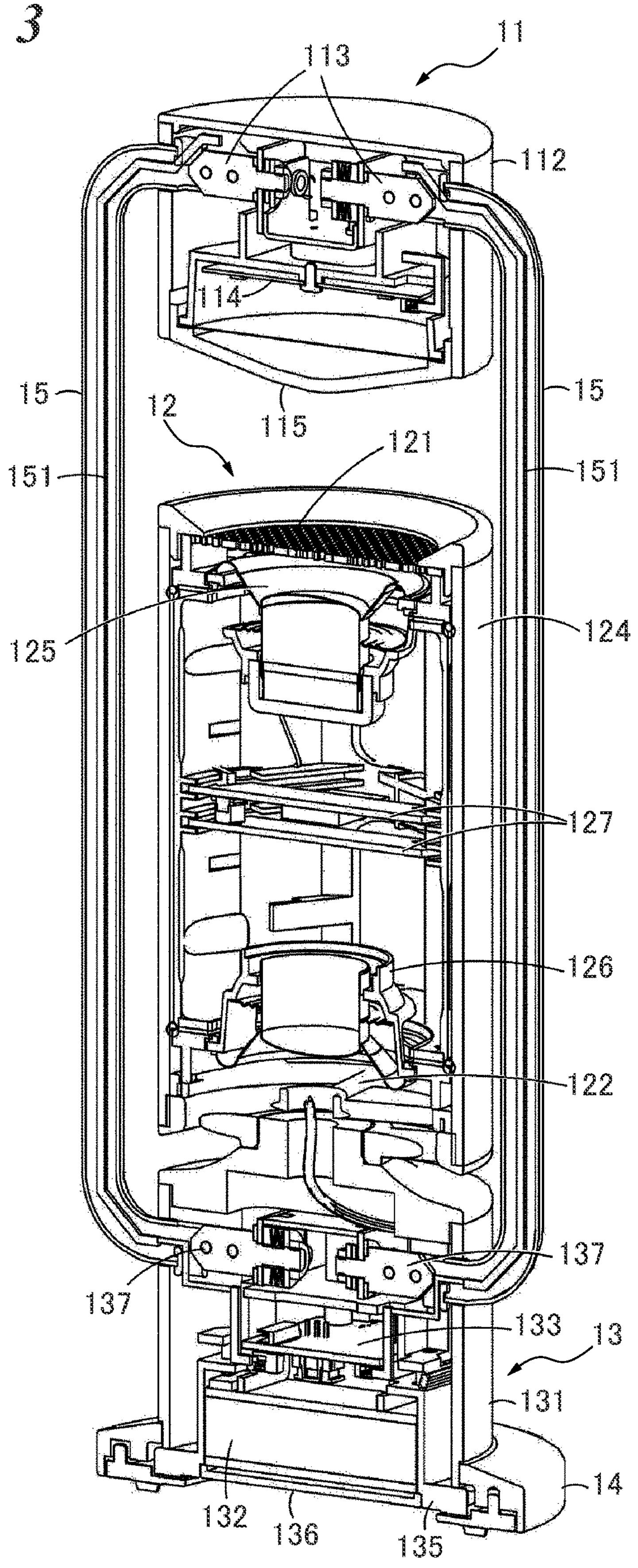
FIG. 3 is a perspective cross-sectional view of the lighting-equipped loudspeaker according to the first embodiment.
Figure 4:
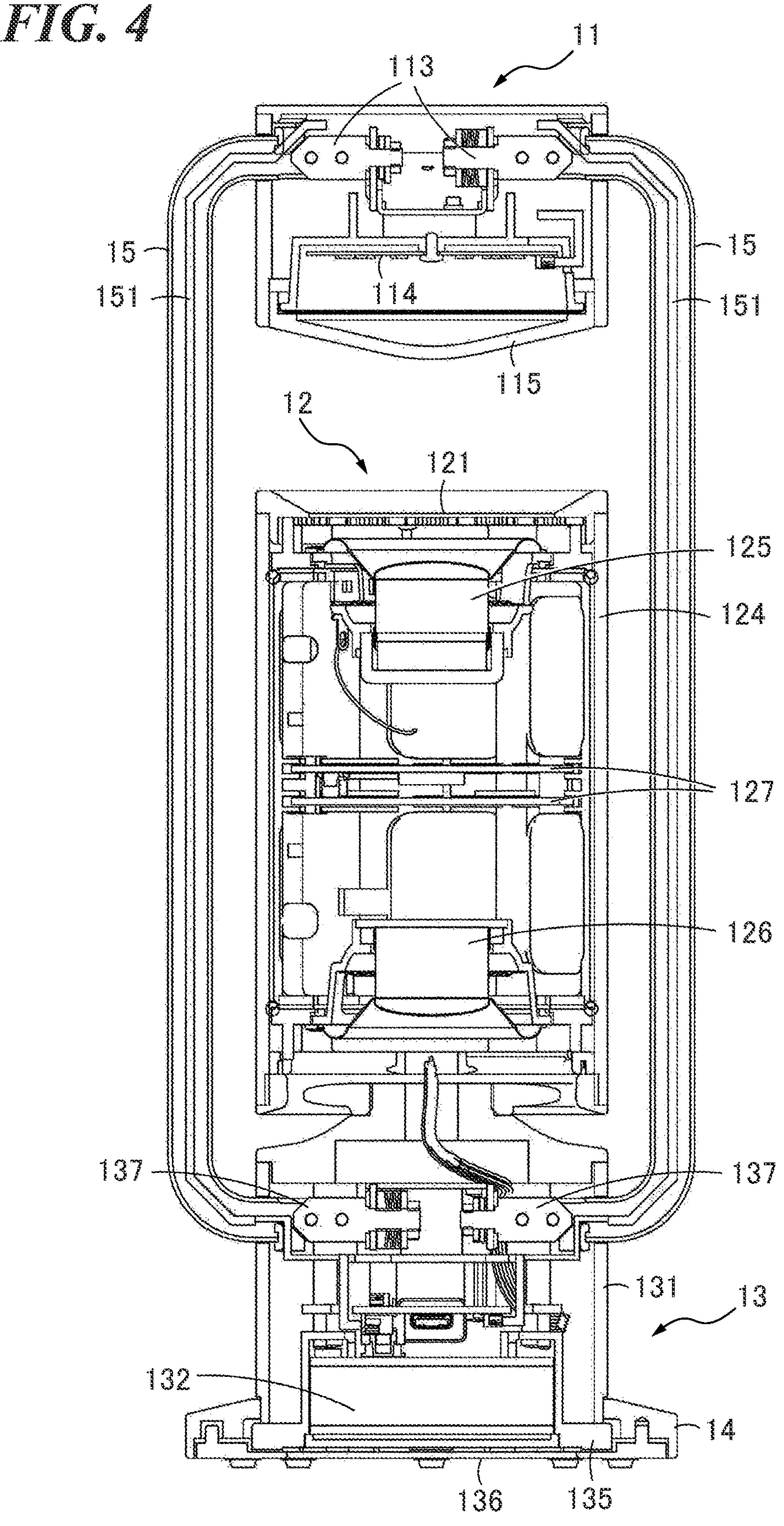
FIG. 4 is a cross-sectional view of the lighting-equipped loudspeaker according to the first embodiment.
Figure 5A:
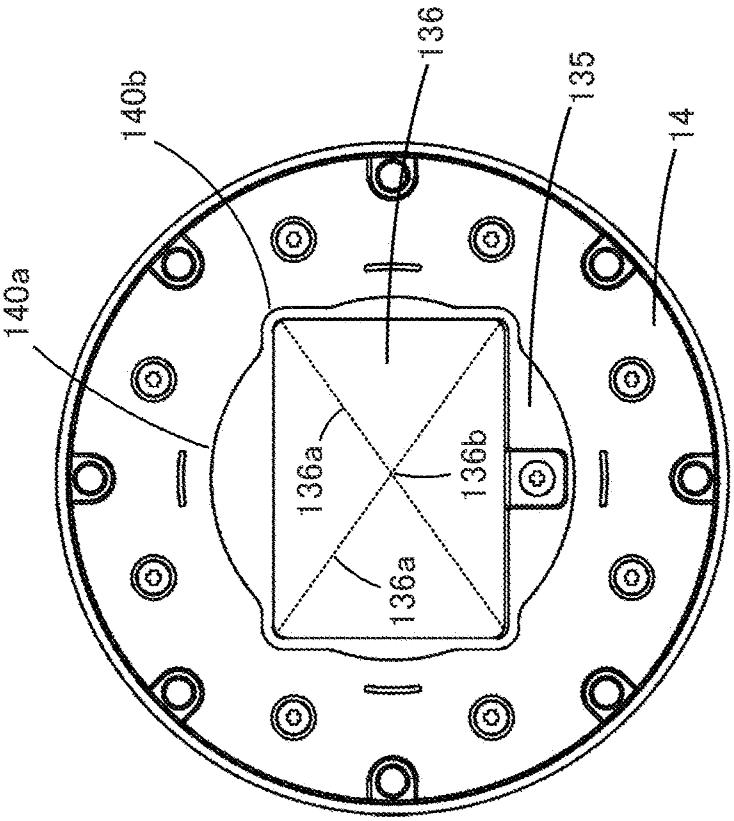
FIGS. 5A and 5B are bottom views showing examples of the attachment/detachment phases of a battery cover of the lighting-equipped loudspeaker according to the first embodiment.
Figure 5B:
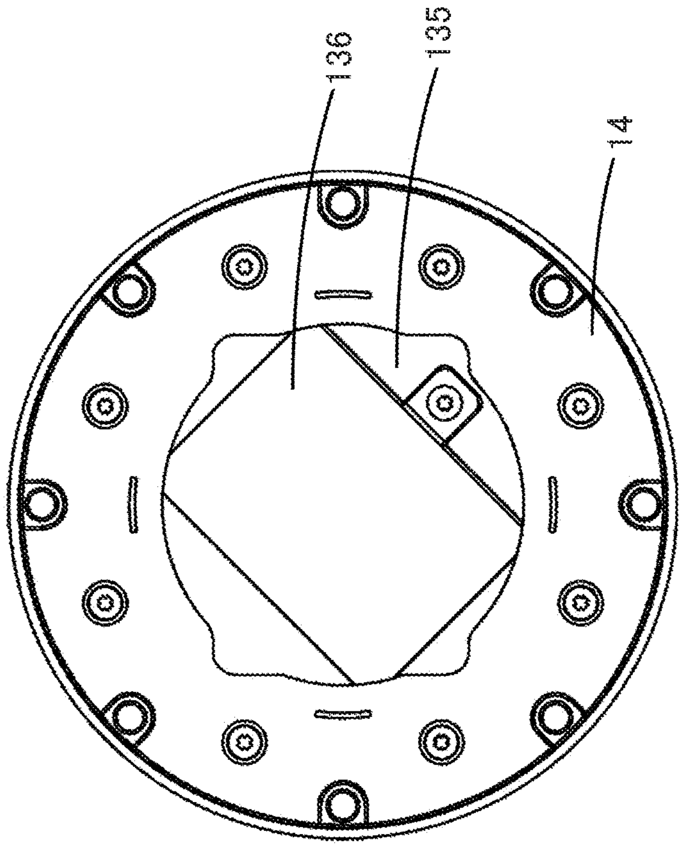

FIG. 3 is a perspective cross-sectional view of the lighting-equipped loudspeaker according to the present embodiment. FIG. 4 is a cross-sectional view of the lighting-equipped loudspeaker according to the present embodiment. FIGS. 5A and 5B are bottom views showing examples of the attachment/detachment phases of a battery cover of the lighting-equipped loudspeaker according to the present embodiment.

The lighting-equipped loudspeaker 1 according to the present embodiment includes a lighting unit 11, a loudspeaker unit 12, a battery unit 13, and a rotation seat 14 from the top, and includes arms 15 on the right and left. The lighting unit 11 includes a light emitting unit (an LED light is used in the present embodiment, but the present invention is not limited thereto) therein, and emits light downward in the state of FIGS. 1A to 1D and FIGS. 2A to 2F.

The loudspeaker unit 12 is an omnidirectional loudspeaker emitting a sound in 360-degree directions. The loudspeaker unit 12 includes on the upper portion a mesh-like cover 121 and a loudspeaker 125 arranged upward, and on the lower portion a beam member 122, a passive radiator 126 arranged downward, and the like. The beam member 122 is provided with a slit 123. The loudspeaker unit 12 outputs a sound from the mesh-like cover 121 and the slit 123. The loudspeaker unit 12 is connected to the battery unit 13 by the beam member 122.

The battery unit 13 has a below-mentioned battery, and supplies power to the lighting unit 11 and the loudspeaker unit 12. The battery unit 13 is rotatable (or turnable) with respect to the rotation seat 14 with the rotation direction thereof in a horizontal plane (in a mounting plane of the apparatus).

The arm 15 is rotatably supported by the battery unit 13, and rotatably supports the lighting unit 11 at the tip end. The battery unit 13 includes a body 131 having substantially the same diameter as a body 124 of the loudspeaker unit 12.

As shown in FIGS. 3 and 4, the battery unit 13 includes a rechargeable battery 132 and a substrate 133. The substrate 133 is provided with a power supply circuit and the like. It should be noted that, as shown in FIG. 2D, a USB terminal 138 is provided on the rear surface of the battery unit 13, and power can be supplied to the battery 132 via the USB terminal 138. It should be noted that the USB terminal 138 is, for example, type C, but may be another type of terminal. Also, data communication with an external device via the USB terminal 138 may be possible.

A bottom portion 135 of the battery unit 13 has an opening for replaceably mounting the battery 132, and a rectangular battery cover 136 is detachably attached to the opening. The battery 132 can be replaced by detaching the battery cover 136. The battery unit 13 is rotatably supported by the rotation seat 14. Hereinafter, description will be given with reference to FIGS. 5A and 5B.

As shown in FIGS. 5A and 5B, the bottom portion 135 and the battery cover 136 rotate (or turn) in the horizontal direction with respect to the rotation seat 14. The battery cover 136 is attached to the bottom portion 135 so as to rotate (or turn) about the intersection of the diagonals of the battery cover 136 at the time of the rotation.

It should be noted that, in the present embodiment, in order to replaceably mount a larger battery, the size of the battery cover 136 (the length of a diagonal 136*a* serving as a longest portion (corresponding to the rotation diameter)) is set to be larger than a diameter (140*a*) of the hole provided at the bottom portion of the rotation seat 14. Then, only at the position shown in FIG. 5A, the diameter of the hole is made long enough for the battery cover 136 to be detachable (to be in a shape of a portion 140*b*).

That is, when the rotation phase of the battery unit 13 with respect to the rotation seat 14 is the phase in FIG. 5A or the phase rotated by 180 degrees from the phase in FIG. 5A, the corners of the battery cover 136 can pass through the hole at the bottom portion of the rotation seat 14. On the other hand, when the rotation phase of the battery unit 13 with respect to the rotation seat 14 is other than the phase of FIG. 5A or the phase rotated by 180 degrees from the phase of FIG. 5A, as in the example shown in FIG. 5B, the corners of the battery cover 136 are caught in the hole of the bottom portion of the rotation seat 14 and cannot pass through the hole. Therefore, the battery cover 136 can be detached only in the phase of FIG. 5A or the phase rotated by 180 degrees from FIG. 5A. That is, the battery 132 can be replaced only in the phase of FIG. 5A or the phase rotated by 180 degrees from FIG. 5A.

With such a configuration, it is possible to further increase the size of the battery cover 136, and thus, it is possible to replaceably mount a larger battery. That is, in the lighting-equipped loudspeaker having the above-described configuration, by setting the size of the battery cover 136 (the length of the diagonal 136*a* serving as a longest portion) to be larger than the diameter of the hole provided at the bottom portion of the rotation seat 14, a larger battery can replaceably be mounted. As a result, the battery can be driven for a long time, and usability can be improved. Also, the area of the bottom surface portion of the rotation seat 14 can be made larger, and the stability when the lighting-equipped loudspeaker 1 is placed as a portable apparatus can be improved. Also, since the battery cover 136 is prevented from coming off unless it is in a specific rotation phase, it is possible to reduce the chances that the battery cover 136 comes off due to an unexpected impact or the like applied during carrying.

In the above configuration, the battery cover 136 is formed in a rectangular shape and is mounted at the position at which the intersection (136*b*) of the diagonals (136*a*) corresponds to the rotation center with respect to the rotation seat 14, and the hole provided in the rotation seat 14 is in a shape having the shorter diameter portion (140*a*) shorter than the length of the diagonal of the battery cover 136 and the longer diameter portion (140*b*) longer than the length of the diagonal of the battery cover 136. When the rotation seat 14 is in the specific rotation phase, the diagonal (136*a*) of the battery cover 136 is located at the longer diameter portion (140*b*) of the hole of the rotation seat 14, and when the rotation seat 14 is not in the specific rotation phase, the diagonal (136*a*) of the battery cover 136 is located at the shorter diameter portion (140*a*) of the hole of the rotation seat 14, so that the battery cover 136 can be detached (that is, the battery 132 can be replaced) only when the rotation seat 14 is in the specific rotation phase (in the case of FIG. 5A).

However, the shape of the battery cover 136 is not limited to the rectangular shape, and may be another shape corresponding to the shape of the battery 132. For example, the shape may be another polygonal shape, a circular shape that is not a perfect circle (a circular shape having a longer diameter portion and a shorter diameter portion), or the like. In this case, the hole provided in the rotation seat 14 is in a shape having a shorter diameter portion shorter than the rotation diameter of the battery cover 136 and a longer diameter portion longer than the rotation diameter of the battery cover 136. When the rotation seat 14 is in a specific rotation phase, a portion corresponding to the rotation diameter of the battery cover 136 (that is, a portion on the outermost side with respect to the rotation center) is located in the longer diameter portion of the hole of the rotation seat 14. When the rotation seat 14 is not in the specific rotation phase, the portion corresponding to the rotation diameter of the battery cover 136 is located in the shorter diameter portion of the hole of the rotation seat 14. Accordingly, only when the rotation seat 14 is in the specific rotation phase, the battery cover 136 is made detachable, and the thus battery 132 is made replaceable.

As described above, the lighting-equipped loudspeaker 1 according to the present embodiment is a vertical wireless loudspeaker, has a lighting unit capable of changing the position and the irradiation angle at the upper portion thereof, can be used not only as an audio device but also as a lighting device for reading or working, serves as an audio device and a lighting device, can be used for a longer time even in a place where it is difficult to secure a power source by mounting a large battery, and is suitable as, for example, a tabletop loudspeaker. It should be noted that, although the lighting-equipped loudspeaker has been described as an example, the present invention is also applicable to a loudspeaker apparatus (a loudspeaker apparatus including the loudspeaker unit 12, the battery unit 13, and the rotation seat 14) not including the lighting unit 11. In general, in a case where the light volume of a wireless lighting-equipped loudspeaker is set to light volume sufficient for reading, working, or the like, power consumption increases, and it is necessary to mount a large battery. Also, even in a case where it is used as a wireless loudspeaker, it is necessary to mount a large battery in order to enable long-time use. Also, the battery to be mounted is desirably replaceable without disassembling the apparatus. Since the conventional wireless loudspeaker is not intended for reading, working, or the like, it is not configured to be able to replaceably mount a large battery that can be used for such a purpose for a long time. It should be noted that it may be possible to replaceably mount a large battery by increasing the size of the apparatus, but such an apparatus has a problem in which the apparatus is unsuitable as, for example, a tabletop loudspeaker. On the contrary, the present embodiment has solved the problem as described above. Therefore, it is possible to provide a loudspeaker apparatus equipped with a large battery while preventing an increase in the external size as a wireless loudspeaker. Also, it is possible to provide a lighting-equipped loudspeaker that can be used not only as a wireless loudspeaker but also as a lighting device at the time of reading or the like, and that can be used for a long time regardless of a place of use.

Second Embodiment

As described above, the lighting-equipped loudspeaker 1 according to the present embodiment includes the loudspeaker unit 12 (first unit) having the loudspeaker 125 therein and the battery unit 13 (second unit) connected to the lower portion of the loudspeaker unit 12. Then, as shown in FIGS. 3 and 4 described above, the lighting-equipped loudspeaker 1 includes the passive radiator 126 in the housing of the loudspeaker unit 12. The passive radiator 126 operates using the aerial vibration generated in the housing when the loudspeaker 125 outputs a sound, and mainly amplifies and reinforces the low tone range. It should be noted that, in the loudspeaker unit 12, the loudspeaker 125 is provided in the housing so as to output a sound toward the upper portion of the housing, and the passive radiator is further provided on the rear side (lower portion) of the loudspeaker 125 in the housing.

Figure 6A:
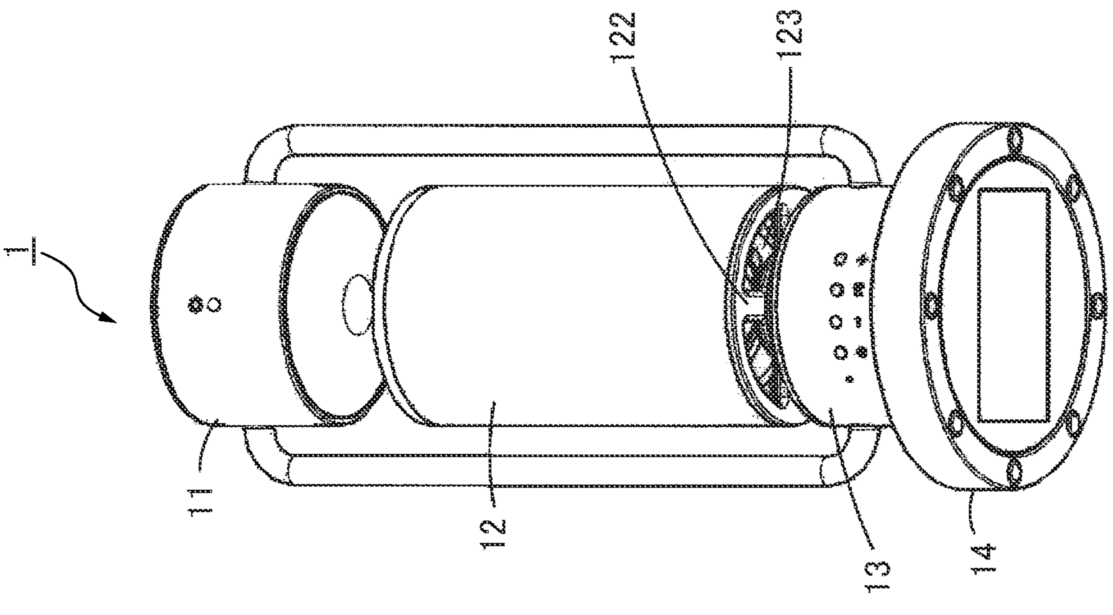
FIGS. 6A and 6B are perspective views of the lighting-equipped loudspeaker according to a second embodiment of the present invention as viewed diagonally from below.
Figure 6B:
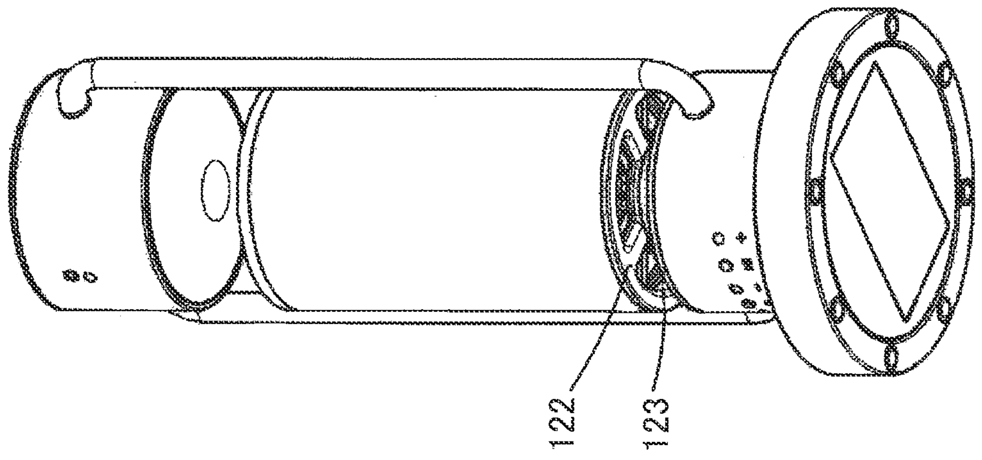

FIGS. 6A and 6B are perspective views of the lighting-equipped loudspeaker 1 as viewed diagonally from below. FIG. 6A is a diagram of the lighting-equipped loudspeaker 1 as viewed from the lower front, and FIG. 6B is a diagram of the lighting-equipped loudspeaker 1 as viewed diagonally from the lower right. A sound output from the passive radiator 126 is output from the slit 123.

Figure 7B:
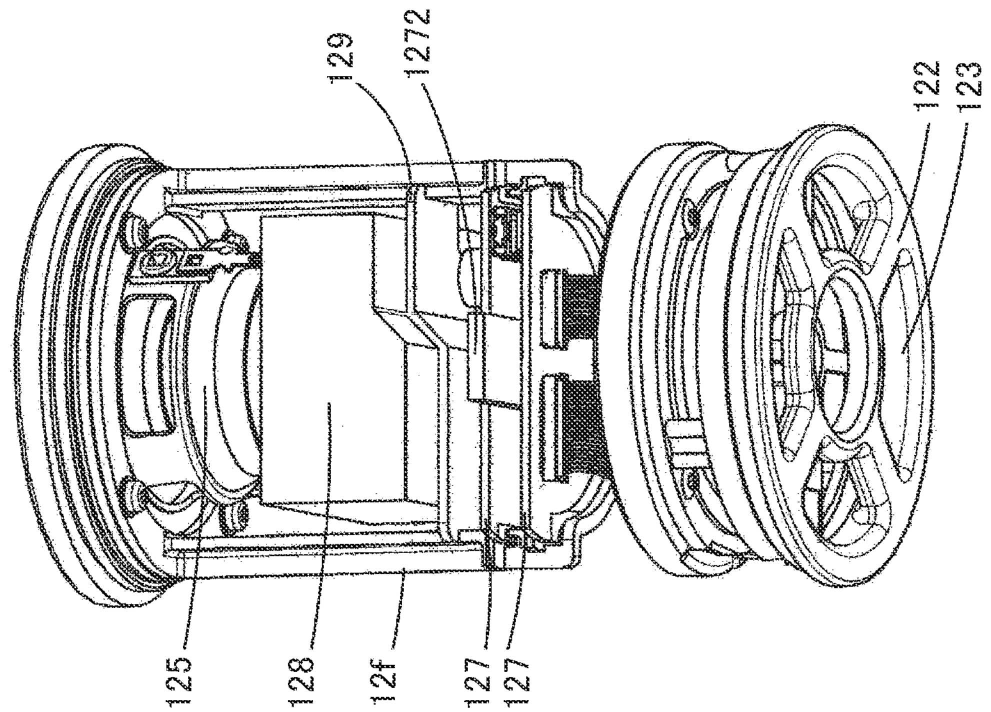
FIGS. 7A and 7B are perspective views for describing an internal configuration of a loudspeaker unit of the lighting-equipped loudspeaker according to the second embodiment.
Figure 7A:
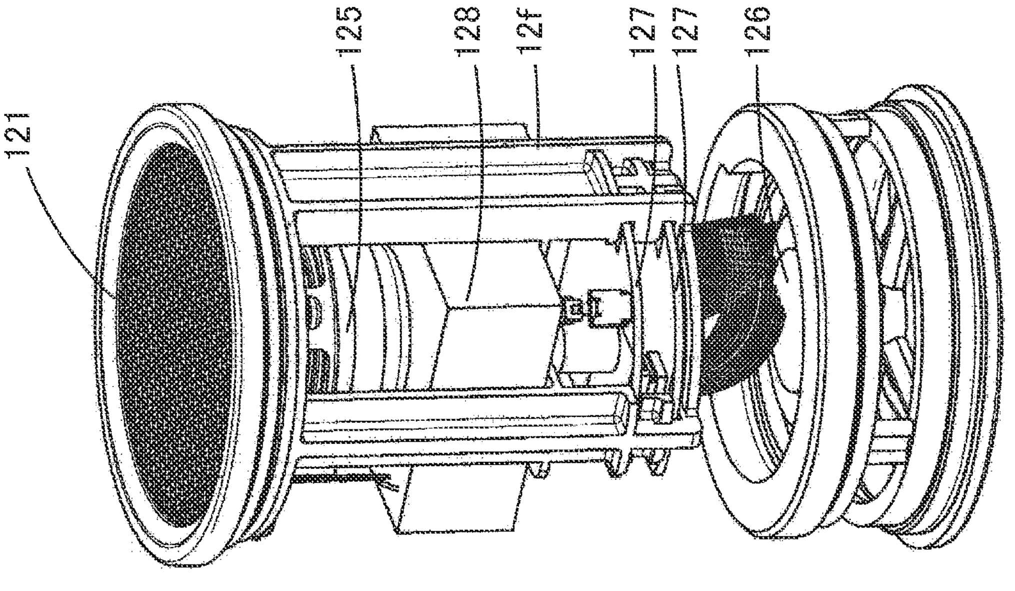

FIGS. 7A and 7B are perspective views for describing the internal configuration of the loudspeaker unit 12. FIG. 7A is a diagram of the internal configuration of the loudspeaker unit 12 as viewed diagonally from above, and FIG. 7B is a diagram of the internal configuration of the loudspeaker unit 12 as viewed diagonally from below. The loudspeaker 125 is supported by a loudspeaker frame 12*f*. A sound absorbing material 128 is provided inside the loudspeaker frame 12*f*. The sound absorbing material 128 is a member for absorbing a sound inside the loudspeaker unit 12. The sound absorbing material 128 has, for example, the effect of flattening frequency characteristics by absorbing medium or high pitched sounds and standing waves, and the effect of lowering resonance sharpness. The lower portion of the sound absorbing material 128 is supported by a resin member 129 (FIGS. 8A to 8E). The sound absorbing material 128 is made of an elastic body and is elastically deformed. The sound absorbing material 128 is attached between the loudspeaker 125 and the resin member 129 in a deformed state. The attached sound absorbing material 128 tries to return to its original shape due to elastic deformation, and a frictional force is generated between the sound absorbing material and contact portions with the loudspeaker 125 and the resin member 129. Due to this frictional force, the sound absorbing material 128 is held between the loudspeaker 125 and the resin member 129.

Figure 8A:
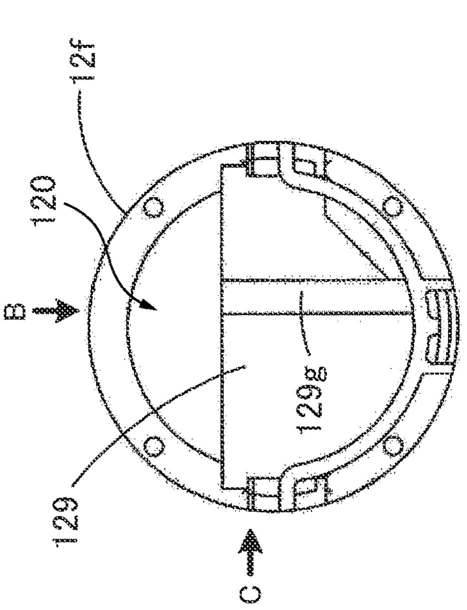
FIGS. 8A to 8E are diagrams for describing a configuration of a loudspeaker frame according to the second embodiment.
Figure 8B:
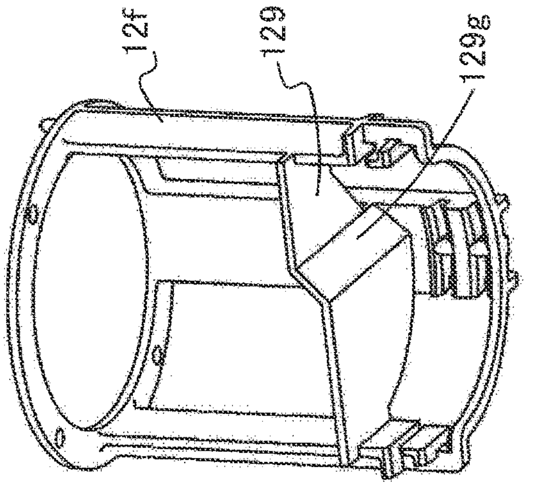
Figure 8C:
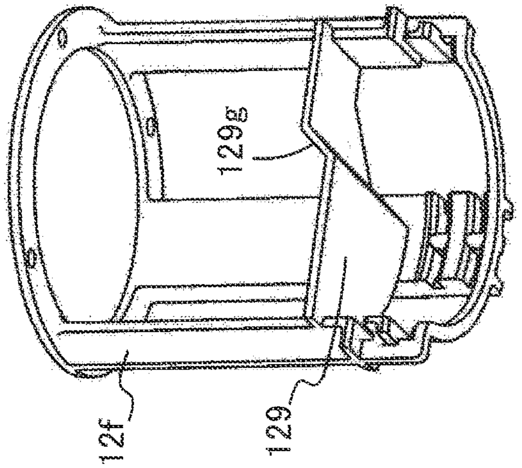
Figure 8D:
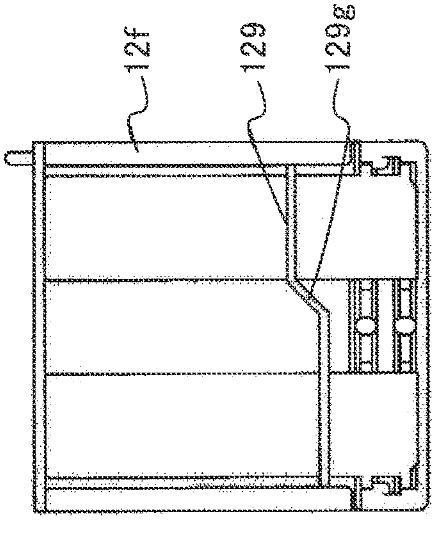
Figure 8E:
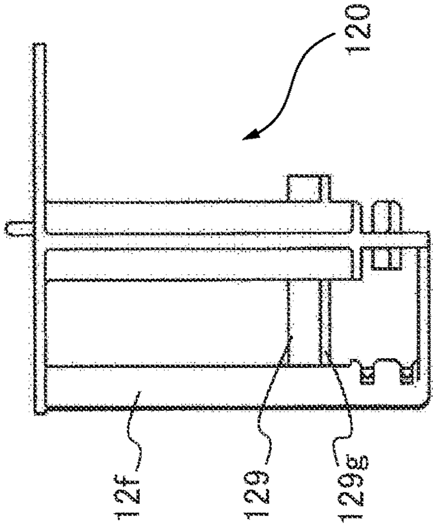

FIGS. 8A to 8E are diagrams for describing a configuration of the loudspeaker frame 12*f*. FIG. 8A is a diagram of the loudspeaker frame 12*f* as viewed from directly below. FIGS. 8B and 8C are perspective views of the loudspeaker frame 12*f* as viewed diagonally from below. FIG. 8D is a side view of the loudspeaker frame as viewed in the direction indicated by the arrow B in FIG. 8A. FIG. 8E is a side view of the loudspeaker frame as viewed in the direction indicated by the arrow C in FIG. 8A.

The resin member 129 shown in FIGS. 8A to 8E is a support member made of resin and supports the sound absorbing material 128 from below. The resin member 129 is in a shape having a step 129*g*, and has a configuration capable of sandwiching the sound absorbing material 128 between the resin member and the loudspeaker 125 while avoiding interference with a capacitor 1271 (FIGS. 9A and 9B) due to the step 129*g*. Also, the resin member 129 has one side thereof formed in a largely cut-out shape, and this cut-out portion forms a sound passage 120 in the housing of the loudspeaker unit 12. Through this sound passage 120, aerial vibration (a sound) from the upper portion of the loudspeaker unit 12 is transmitted to the passive radiator 126 provided on the lower side.

Figure 9A:
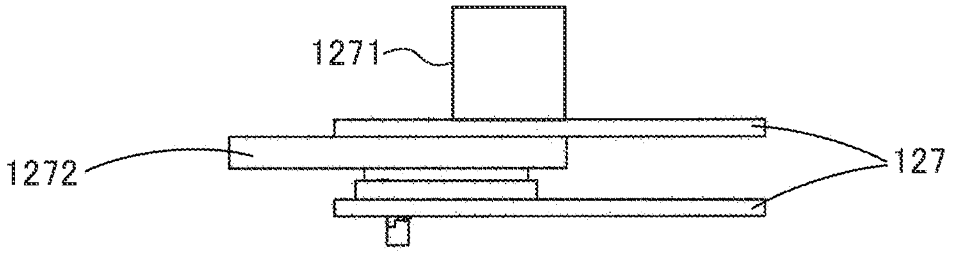
FIGS. 9A and 9B are diagrams for describing a configuration of a loudspeaker substrate according to the second embodiment.
Figure 9B:
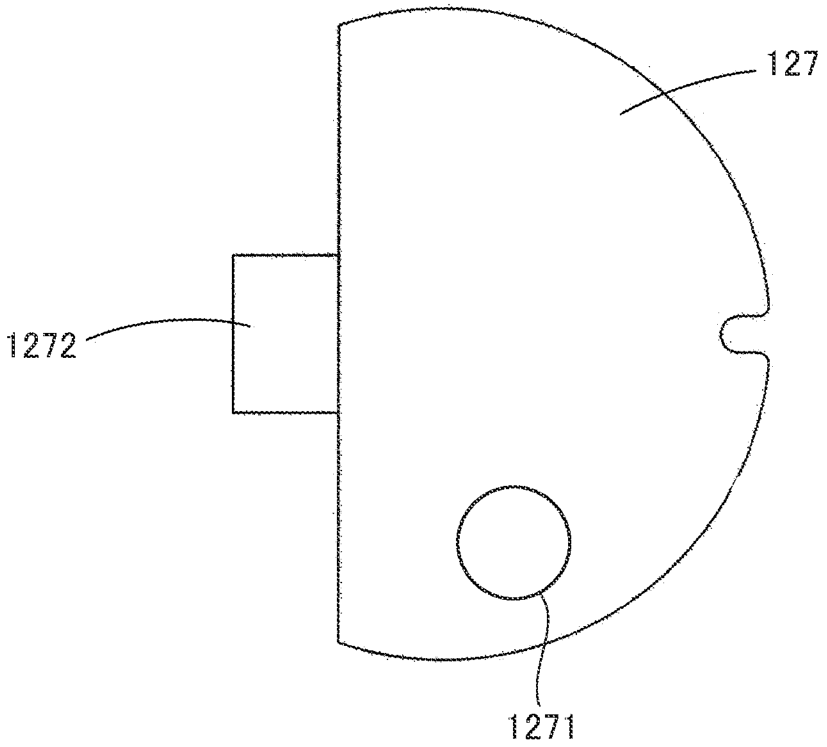

FIGS. 9A and 9B are diagrams for describing a configuration of a loudspeaker substrate 127. FIG. 9A is a side view of the loudspeaker substrate 127, and FIG. 9B is a plan view of the loudspeaker substrate 127 as viewed from above. The loudspeaker substrate 127 is provided with various electronic components which are not shown, the capacitor 1271, a wireless module (for example, a Bluetooth (registered trademark) module 1272), and the like. It should be noted that the wireless module may be another wireless module such as a Wi-Fi module. The loudspeaker substrate 127 is formed in a cut-out circular shape such as a semicircle (a circle in which a part (left side in FIG. 9B) is cut out), and this cut-out portion serves as a sound passage. Through this sound passage, aerial vibration (the sound) from the upper portion of the loudspeaker unit 12 is transmitted to the passive radiator 126 provided on the lower portion.

Figure 10A:
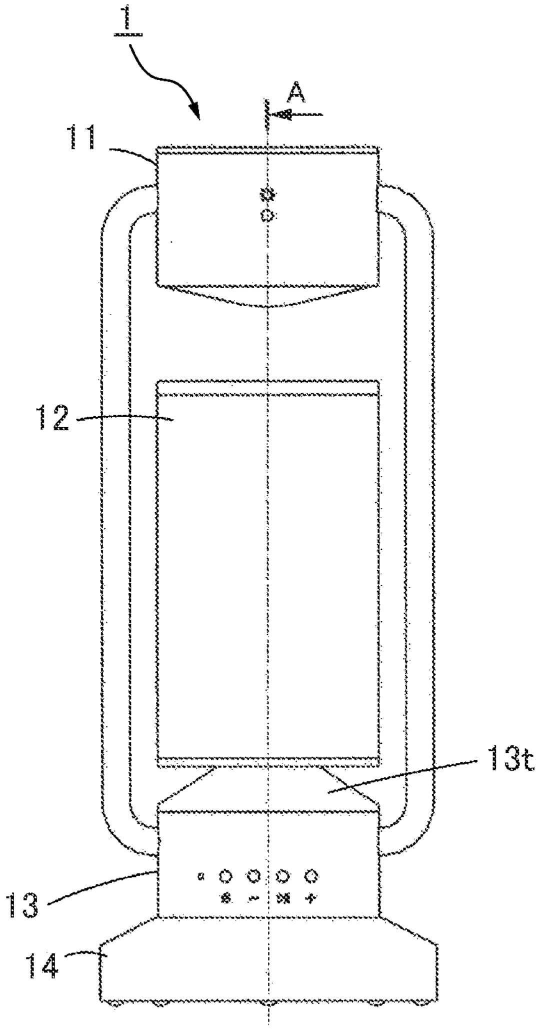
FIGS. 10A and 10B are a front view and a cross-sectional view of the lighting-equipped loudspeaker according to the second embodiment.
Figure 10B:
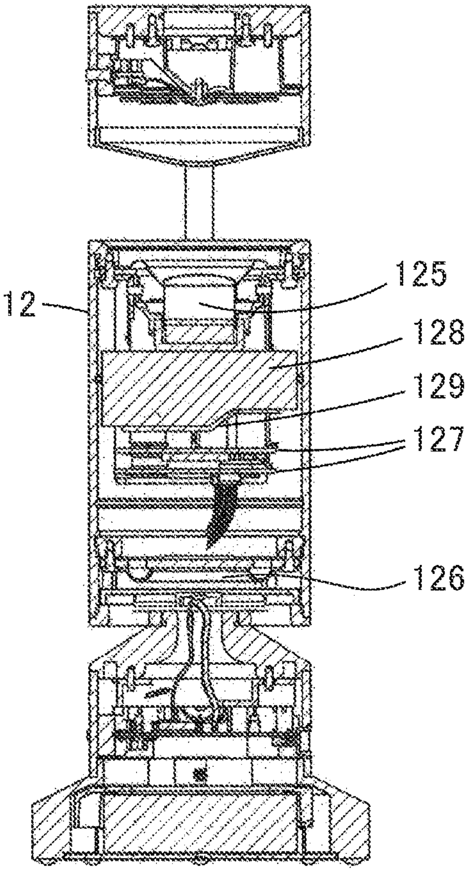

FIGS. 10A and 10B are a front view and a cross-sectional view of the lighting-equipped loudspeaker 1. FIG. 10A is a front view of the lighting-equipped loudspeaker 1, and FIG. 10B is a cross-sectional view of the lighting-equipped loudspeaker 1 cut along the cut surface A-A shown in FIG. 10A. As shown in FIG. 10B, a space is formed between the inner surface of the housing of the loudspeaker unit 12 and the periphery of the sound absorbing material 128. That is, there is a gap around the sound absorbing material 128, and spaces existing between the loudspeaker 125 and the passive radiator 126 linearly communicate with each other through the gap. This space serves as a sound passage in the loudspeaker unit 12.

As shown in each of the above-described figures, in the lighting-equipped loudspeaker 1, the passive radiator 126 is provided not at the bottom portion of the lighting-equipped loudspeaker 1 in contact with a stand such as a desk, but in the loudspeaker unit 12 in the middle not in contact with the stand. As a result, the vibration of a sound output from the passive radiator 126 is less likely to be transmitted to the stand. Further, an upper surface 13*t* of the battery unit 13 is located at a position opposed to the output port (slit 123) of the passive radiator 126. The upper surface 13*t* is an inclined surface whose distance from the output port of the passive radiator 126 increases toward the radially outer side of the housing. The upper surface 13*t* and the side surface of the battery unit 13 are made of metal such as strong aluminum having an integrated structure, and can appropriately reflect a sound while suppressing generation of a chattering sound due to the sound output from the passive radiator 126. In this manner, in the lighting-equipped loudspeaker 1, it is possible to suppress deterioration in sound quality caused by a chattering sound or the like. It should be noted that the metal constituting the housing of the battery unit 13 is not limited to aluminum, and may be other kinds of metal.

Since the conventional wireless loudspeaker includes the passive radiator on the bottom surface of the apparatus, there is a problem in which sound vibration may be transmitted to the stand to generate a chattering sound, which may deteriorate the sound quality. However, the lighting-equipped loudspeaker 1 solves this problem.

Also, as described above, the resin member 129 is in a shape having the step 129*g*, and is attached so that the capacitor 1271 on the loudspeaker substrate 127 may be housed in the space created by the step 129*g*. That is, the resin member 129 supports the sound absorbing material 128 while avoiding interference with the capacitor 1271. With such a configuration, downsizing of the loudspeaker unit 12 is achieved (an increase in size can be suppressed). Furthermore, the loudspeaker unit 12 includes, in the housing thereof, the loudspeaker 125 provided so as to output a sound toward the outside of the housing (upward), the sound absorbing material 128 on the rear surface side (lower side) of the loudspeaker 125, the loudspeaker substrate 127 formed in a cut-out circular shape on the side (lower side) of the sound absorbing material 128 opposite to the loudspeaker 125, and the passive radiator 126 provided on the side of the loudspeaker substrate 127 opposite to the sound absorbing material 128 so as to output a sound toward the outside of the housing (downward).

It should be noted that the sound absorbing material 128 is provided so as to form a space (gap) around the sound absorbing material 128, that is, between the sound absorbing material 128 and the inner surface of the housing of the loudspeaker unit 12, and this gap serves as a sound passage. Specifically, as shown in FIGS. 7A and 7B, the sound absorbing material 128 is formed in a rectangular solid shape, and a gap is formed between each side and the inner surface of the circular housing.

Also, the Bluetooth (registered trademark) module 1272 is provided in the cut-out portion of the cut-out circular loudspeaker substrate 127 (FIGS. 9A and 9B). It should be noted that the cut-out portion of the cut-out circular loudspeaker substrate 127 also serves as a sound passage. With such a configuration of forming a sound passage, aerial vibration (a sound) from the loudspeaker 125 provided at the upper portion of the loudspeaker unit 12 is appropriately transmitted to the passive radiator 126 without increasing the size. In particular, in the present embodiment, there is a positional relationship in which the gap between each side of the sound absorbing material 128 and the inner surface of the housing and the cut-out portion of the cut-out circular loudspeaker substrate 127 overlap with each other in the vertical direction, and a sound is more easily transmitted from the loudspeaker 125 to the passive radiator 126.

As described above, according to the second embodiment, it is possible to provide a compact loudspeaker apparatus that achieves excellent sound quality while suppressing an increase in size of the apparatus.

Third Embodiment

Figure 11B:
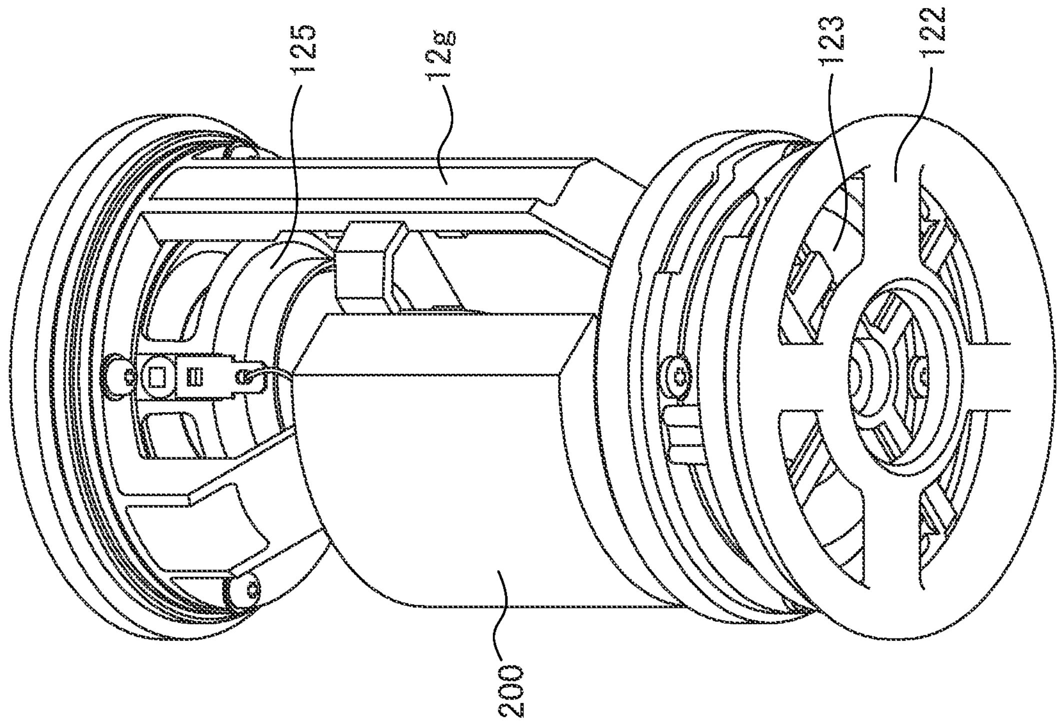
FIGS. 11A and 11B are perspective views for describing a variation of an internal configuration of the loudspeaker unit of the lighting-equipped loudspeaker according to a third embodiment of the present invention.
Figure 11A:
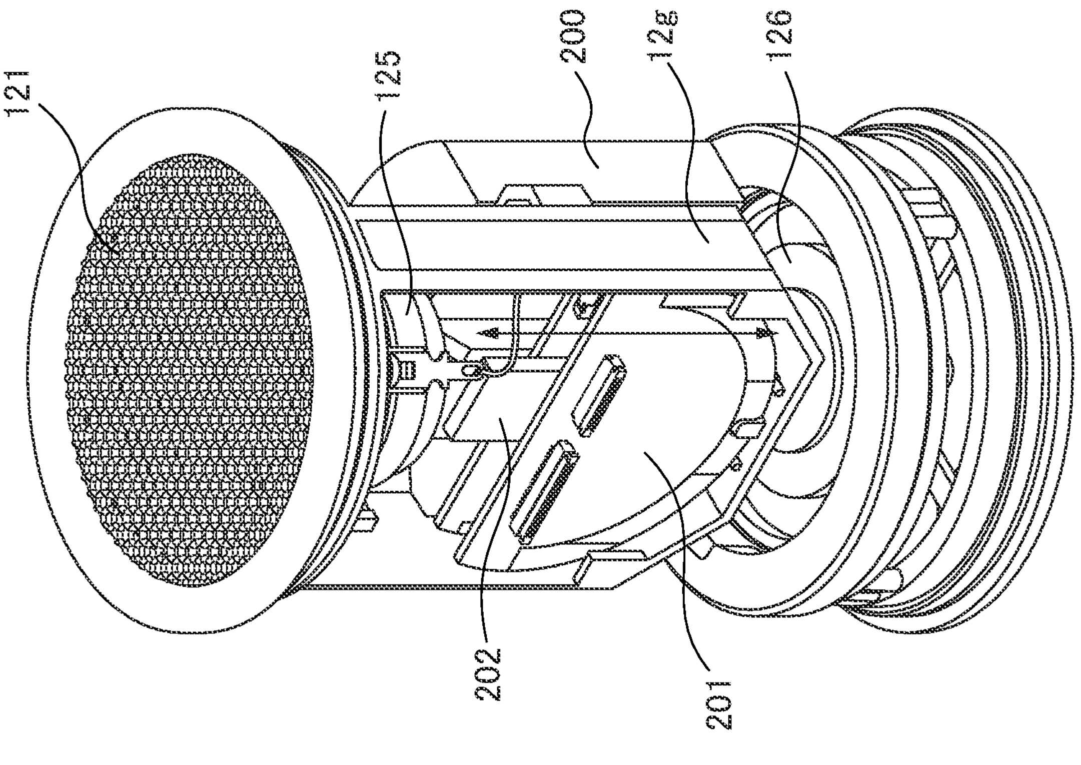

FIGS. 11A and 11B are perspective views for describing a variation of the internal configuration of the loudspeaker unit 12. FIG. 11A is a diagram of the variation of the internal configuration of the loudspeaker unit 12 as viewed diagonally from above, and FIG. 11B is a diagram of the variation of the internal configuration of the loudspeaker unit 12 as viewed diagonally from below. A loudspeaker frame 12*g* is disposed between the loudspeaker 125 and the passive radiator 126. The loudspeaker 125 is supported by the loudspeaker frame 12*g*, and the passive radiator 126 is suspended and supported by the loudspeaker frame 12*g*. A sound absorbing material 200 is attached to the loudspeaker frame 12*g*. The sound absorbing material 200 is a member for absorbing a sound inside the loudspeaker unit 12. Similarly to the sound absorbing material 128, the sound absorbing material 200 is made of an elastic body, and exhibits, for example, the effect of flattening frequency characteristics by absorbing medium or high pitched sounds and standing waves, and the effect of lowering resonance sharpness. The sound absorbing material 200 is attached to the loudspeaker frame 12*g* (FIGS. 12A to 12E) so as to cover a part of the semicircular portion in the cross section of the substantially cylindrical space between the loudspeaker 125 and the passive radiator 126.

Figure 12C:
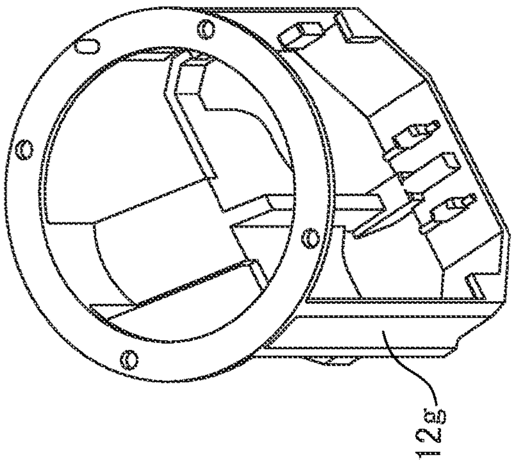
FIGS. 12A to 12E are diagrams for describing a variation of a configuration of a loudspeaker frame according to the third embodiment.
Figure 12B:
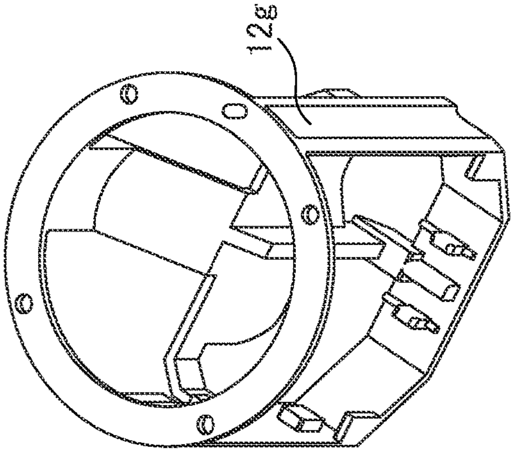
Figure 12E:
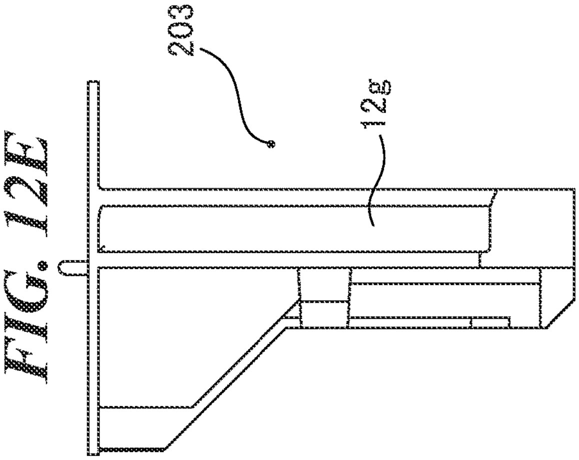
Figure 12A:
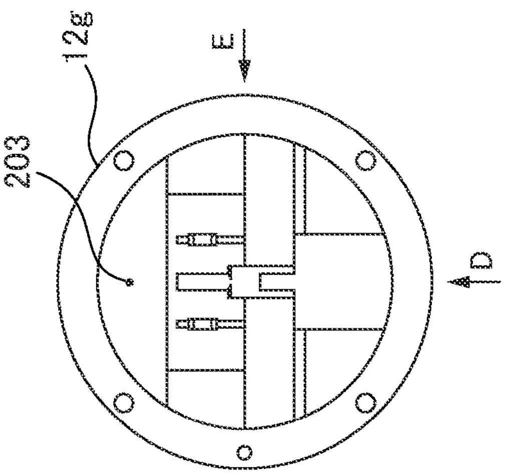
Figure 12D:
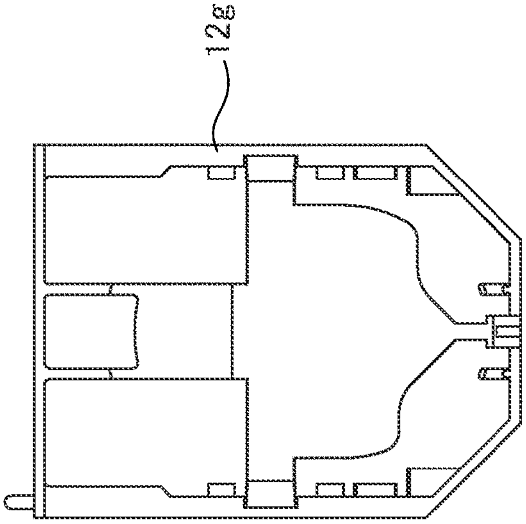
Figure 13A:
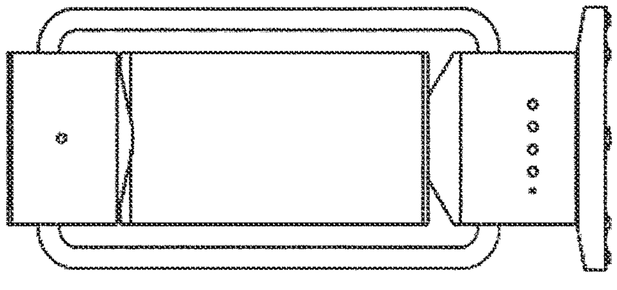
FIGS. 13A to 13E are diagrams showing a use state by changing the position and the direction of a lighting unit according to a fourth embodiment of the present invention.
Figure 13B:
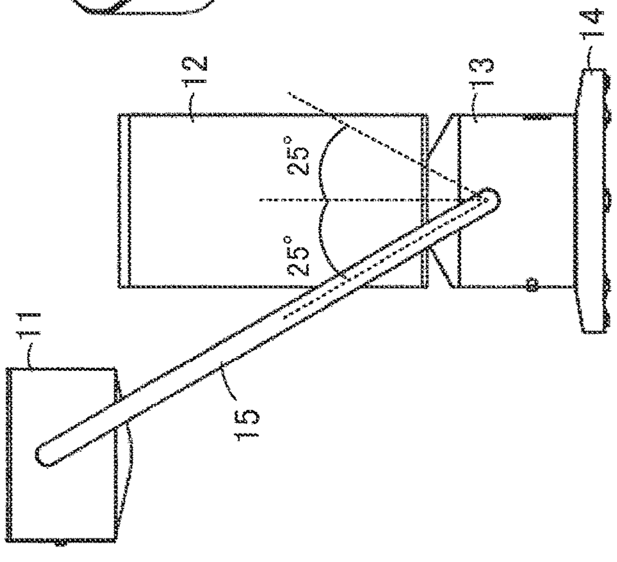
Figure 13C:
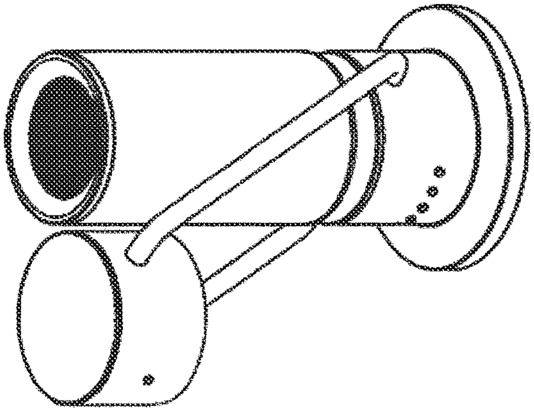
Figure 13D:
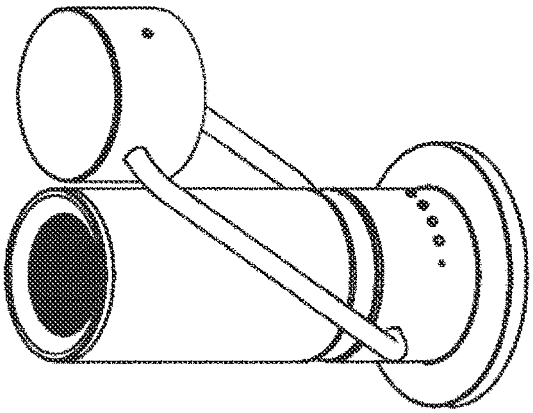
Figure 13E:
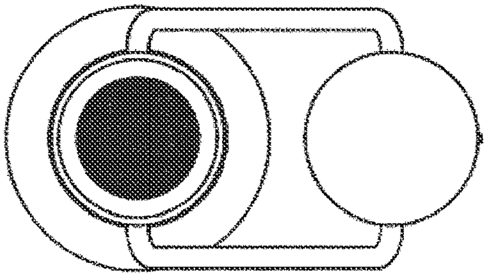

FIGS. 12A to 12E are diagrams for describing a configuration of the loudspeaker frame 12*g*. FIG. 12A is a diagram of the loudspeaker frame 12*g* as viewed from directly above. FIGS. 12B and 12C are perspective views of the loudspeaker frame 12*g* as viewed diagonally from above. FIG. 12D is a side view of the loudspeaker frame as viewed in the direction indicated by the arrow D in FIG. 12A. FIG. 12E is a side view of the loudspeaker frame as viewed in the direction indicated by the arrow E in FIG. 12A.

The loudspeaker frame 12*g* is a frame body protruding downward and formed substantially in a U shape in a side view, and a substantially semicircular substrate 201 is attached thereto. The substrate 201 is disposed so that the surface thereof is parallel to the vertical direction (arrow direction in FIG. 11A) from the loudspeaker 125 toward the passive radiator 126. At this time, the circumferential portion of the substrate 201 protrudes downward and substantially coincides with the bent portion of the bottom portion of the loudspeaker frame 12*g* (FIG. 11A). Furthermore, the sound absorbing material 200 is disposed so as to sandwich the loudspeaker frame 12*g* between the sound absorbing material 200 and the substrate 201 (FIG. 11B).

Since the substrate 201 is disposed so that the surface thereof is parallel to the vertical direction, the space between the loudspeaker 125 and the passive radiator 126 directly communicates to form a sound passage 203 in the housing of the loudspeaker unit 12. As described above, the sound absorbing material 200 closes only a part of the semicircular portion in the cross section of the space between the loudspeaker 125 and the passive radiator 126. Therefore, the cross-sectional area of the sound passage 203 is larger than the cross-sectional area of the sound passage according to the second embodiment formed by the gap between the inner surface of the housing of the loudspeaker unit 12 and the periphery of the sound absorbing material 128. As a result, since the aerial vibration (a sound) from the upper portion of the loudspeaker unit 12 is efficiently transmitted to the passive radiator 126, a sound in the low tone range of the loudspeaker 125 can further be amplified and reinforced by the passive radiator 126 than in the second embodiment.

Also, similarly to the loudspeaker substrate 127, the substrate 201 is provided with various electronic components which are not shown, a wireless module (for example, a Bluetooth (registered trademark) module 202), and the like. It should be noted that the wireless module may be another wireless module such as a Wi-Fi module. In particular, the Bluetooth module 202 is disposed on the substrate 201 so as to face the sound absorbing material 200, but a part thereof protrudes upward from the substrate 201 and is exposed to the sound passage 203. As described above, since the cross-sectional area of the sound passage 203 is large, it is easy to perform wireless communication between the Bluetooth module 202 and a wireless communication device outside the lighting-equipped loudspeaker 1 via the sound passage 203. This enables various operations of the lighting-equipped loudspeaker 1 to be reliably performed by an external wireless communication device via the Bluetooth module 202.

Fourth Embodiment

FIGS. 13A to 15E are diagrams showing states in which the loudspeaker apparatus (light-equipped loudspeaker 1) according to the present embodiment is used by changing the position and the direction of the lighting unit 11. The lighting-equipped loudspeaker 1 according to the present embodiment includes the loudspeaker unit 12 (first unit) having the loudspeaker 125 therein, the lighting unit 11 provided on the upper side of the loudspeaker unit 12, and the battery unit 13 (second unit) connected to the lower portion of the loudspeaker unit 12. The lighting unit 11 includes a light emitting unit (an LED light (a below-mentioned LED substrate 114) is used in the present embodiment, but the present invention is not limited thereto) therein, and emits light downward in the state of FIGS. 1A to 1D and FIGS. 2A to 2F. In the lighting-equipped loudspeaker 1, a hinge 137 (FIGS. 3 and 4) is provided in the battery unit 13 and turnably supports the arm 15. Also, in the lighting-equipped loudspeaker 1, a hinge 113 (FIGS. 3 and 4) is provided in the lighting unit 11 and turnably supports the lighting unit 11. With such a configuration, in the lighting-equipped loudspeaker 1, the arm 15 and the lighting unit 11 can freely turn. Therefore, the user can use the lighting-equipped loudspeaker 1 as a lighting device at the time of reading, working, or the like by illuminating an arbitrary place that the user wishes to be illuminated.

Figure 16D:
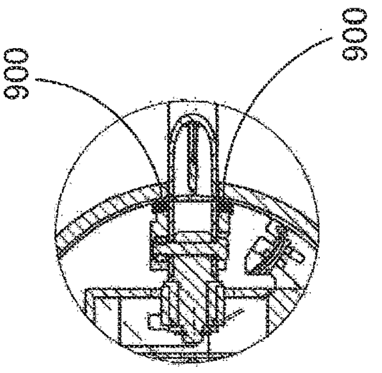
FIGS. 16A to 16F are a front view and cross-sectional views of the lighting-equipped loudspeaker according to the fourth embodiment.
Figure 16F:
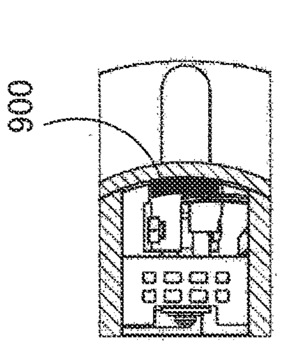
Figure 16C:
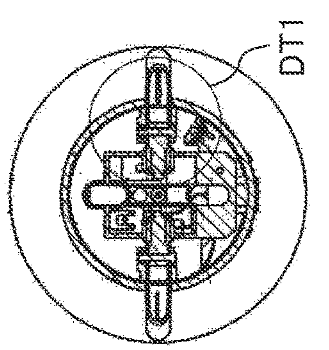
Figure 16E:
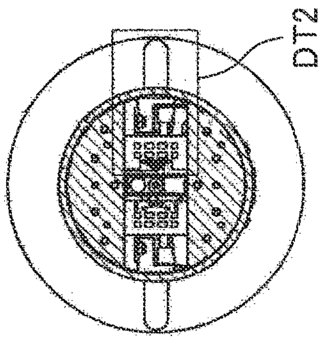
Figure 16B:
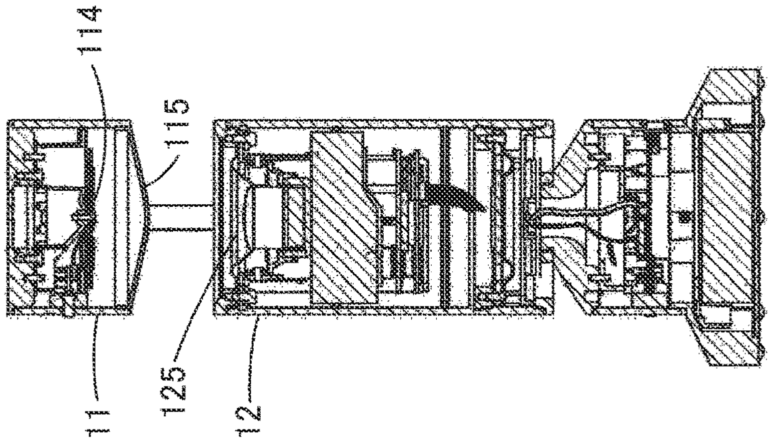
Figure 16A:
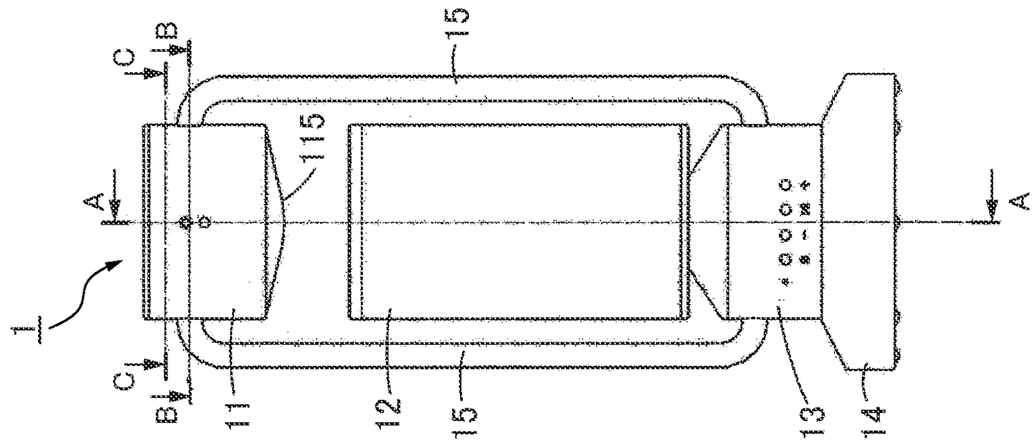

FIGS. 16A to 16F are a front view and cross-sectional views of the lighting-equipped loudspeaker 1. FIG. 16A is a front view of the lighting-equipped loudspeaker 1, and FIG. 16B is a cross-sectional view of the lighting-equipped loudspeaker 1 cut along the cut surface A-A shown in FIG. 16A. FIG. 16C is a cross-sectional view of the lighting-equipped loudspeaker 1 cut along the cut surface B-B shown in FIG. 16A, and FIG. 16D is an enlarged view of the portion DT1 of the cut surface shown in FIG. 16C, and corresponds to a cross-sectional view of a portion to which the arm 15 is connected. Also, FIG. 16E is a cross-sectional view of the lighting-equipped loudspeaker 1 cut along the cut surface C-C shown in FIG. 16A, and FIG. 16F is an enlarged view of the portion DT2 of the cut surface shown in FIG. 16E, and corresponds to a cross-sectional view further on the upper portion than the portion to which the arm 15 is connected.

As shown in FIGS. 16A and 16B, a diffuser 115 (diffusion plate) is provided on the lower portion of the lighting unit 11. The diffuser 115 is made of a light transmissive, milky white material, for example, and is formed in a downward (that is, the direction in which the lighting unit 11 emits light) substantially conical shape (tapered shape) as shown in FIGS. 16A and 16B, and this tapered shape has the effect of diffusing the irradiation light from the light emitting unit 114 in all directions.

Figure 14A:
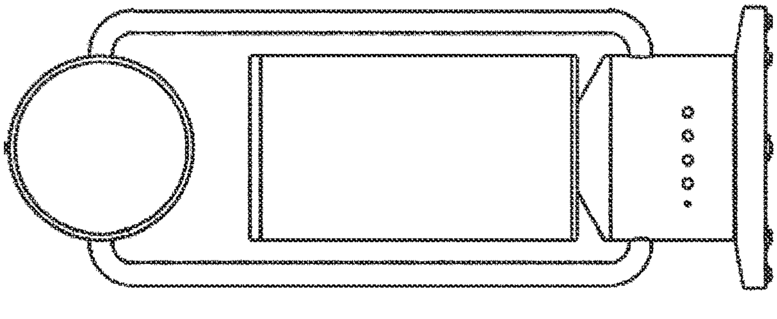
FIGS. 14A to 14E are diagrams showing a use state by changing the position and the direction of the lighting unit according to the fourth embodiment.
Figure 14B:
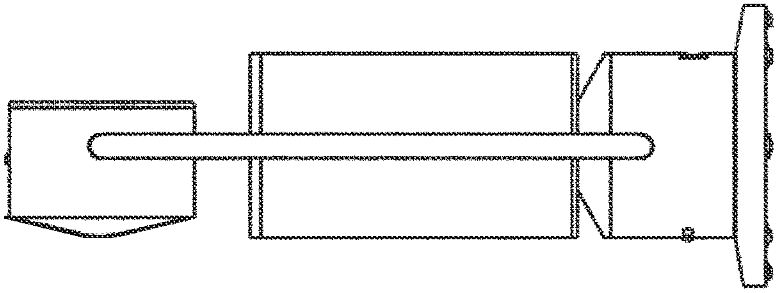
Figure 14C:
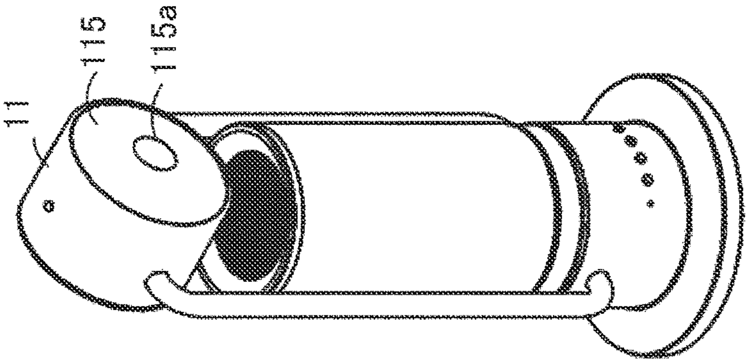
Figure 14D:
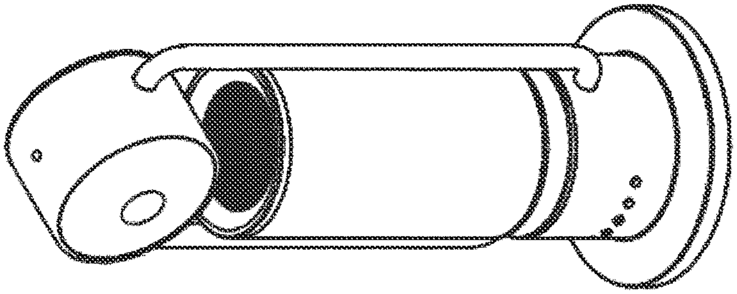
Figure 14E:
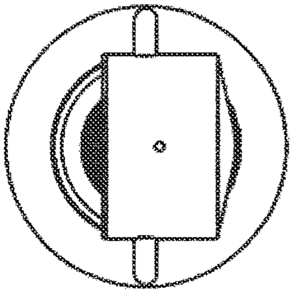
Figure 15E:
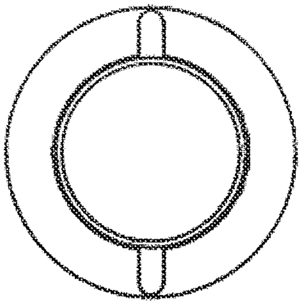
FIGS. 15A to 15E are diagrams showing a use state by changing the position and the direction of the lighting unit according to the fourth embodiment.
Figure 15D:
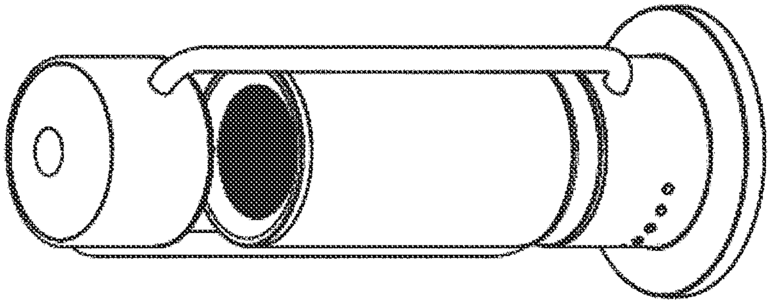
Figure 15C:
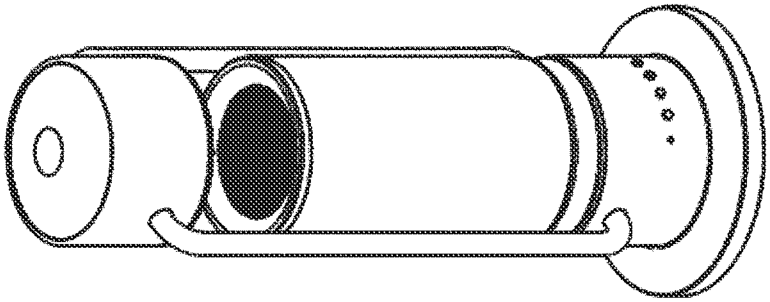
Figure 15B:
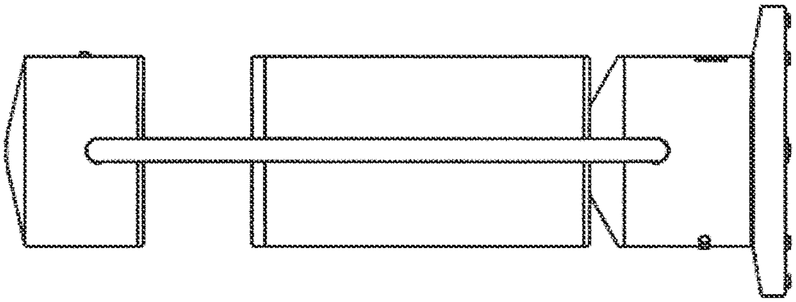
Figure 15A:
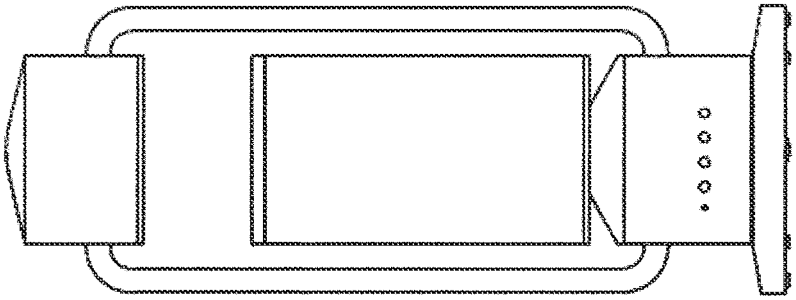

Also, in a case where the diffuser 115 takes a posture in which the center of the diffuser 115 and the center of the loudspeaker 125 are opposed to each other and are substantially aligned as shown in FIGS. 16A and 16B, the diffuser 115 has the effect of diffusing the irradiation light from the light emitting unit 114 in all directions while preventing front reflection of a sound output from the loudspeaker 125 due to the above-described tapered shape. Also, as shown in FIG. 14C, the diffuser 115 may be formed in a shape in which an angle of the tapered shape changes at a boundary 115*a* such as to diffuse light and a sound at an optimum angle. In this case, the center side area inside the boundary 115*a* may be a flat surface having no diffusion effect that does not affect the reflection of a sound. Also, a camera may be provided inside the lighting unit 11 such that a lens of the camera is arranged on the center side area inside the boundary 115_a_ or another place. Further, an audio input unit (not shown) having a microphone therein may be provided on the front surface of the lighting unit 11.

Also, as shown in FIGS. 13A to 15E, in the lighting-equipped loudspeaker 1 according to the present embodiment, for example, the arm 15 is turnable in the range of −25 degrees to 25 degrees (angle in FIG. 13B) with the vertical direction as 0 degrees, the lighting unit 11 is turnable in the range of −90 degrees (angle in FIGS. 14A to 14E) to 180 degrees (angle in FIGS. 15A to 15E) with the state shown in FIG. 2 as 0 degrees, and the rotation seat 14 is turnable by 360 degrees. Also, the illumination by means of the lighting unit 11 can be controlled, and for example, sunlight colors and warm colors can be switched with a plurality of levels of brightness. Also, in the lighting-equipped loudspeaker 1 according to the present embodiment, the position and the irradiation angle of the lighting unit 11 provided at the upper portion of the apparatus can easily be changed with one hand without the need for support of the apparatus main body with the other hand, and light can freely be emitted in an arbitrary direction that the user wishes for. It should be noted that changing the position and the irradiation angle of the lighting unit 11 as described above causes the reflection, the directivity, and the quality of a sound output from the loudspeaker 125 to be changed. That is, the user can change the sound quality by changing the position and the irradiation angle of the lighting unit 11. It should be noted that, since the lighting unit 11 is formed in a cylindrical shape, and the diffuser 115 is formed in a conical shape, the output port of the loudspeaker 125 and the surface of the lighting unit 11 do not face each other even when the angle of the lighting unit 11 is set to any angle from −90 degrees to 90 degrees.

Also, the lighting unit 11 may be used in a manner in which the angle of the lighting unit 11 is adjusted in a range of −90 degrees shown in FIGS. 14A to 14E to 180 degrees shown in FIGS. 15A to 15E, and in which a sound output from the loudspeaker 125 is reflected in a specific direction on the upper surface of the lighting unit 11, so that the loudspeaker 125 may have directivity. By providing directivity, for example, it is possible to improve listening easiness of a conversation in a video conference (TV conference) or the like. In this manner, the user can change the sound quality and the directivity in accordance with the use application such as music appreciation and video conferencing.

As described above, in the lighting-equipped loudspeaker 1 according to the present embodiment, the arm 15 is turnably attached to the lighting unit 11 in order to achieve the configuration in which the position and the irradiation angle of the lighting unit 11 can freely be changed. The lighting unit 11 is provided with a hole through which the arm 15 passes at an attachment portion of the arm 15, and the arm 15 is inserted into the hole. Therefore, there is a concern that light of the light emitting unit (LED substrate 114) inside the lighting unit 11 may leak from the attachment portion of the arm 15 (the gap between the hole and the arm 15). In order to prevent this, in the present embodiment, as shown in FIGS. 16D and 16F, a light shielding sheet 900 as shown in FIGS. 17A to 17D is provided at the attachment portion of the arm 15 in the lighting unit 11.

The light shielding sheet 900 is a ring-shaped light shielding sheet having a through hole having a diameter substantially equal to the diameter of the arm 15. The light shielding sheet 900 is disposed so as to be curved along the inner surface of the cylindrical housing of the lighting unit 11, lets the arm 15 pass through the through hole thereof, and is sandwiched between the inner surface of the housing of the lighting unit 11 and the connection portion of the tip end of the arm 15. At this time, the inner diameter of the through hole corresponds to the outer diameter of the arm 15 so that a gap may not be created between the inside of the ring of the light shielding sheet 900 and the arm 15. It should be noted that FIGS. 16D and 16F show a state in which the light shielding sheet 900 is attached to the arm attachment portion of the lighting unit 11 on the right as viewed from the front, but similarly, another light shielding sheet 900 is also attached to an arm attachment portion on the left as viewed from the front.

Figure 17A:
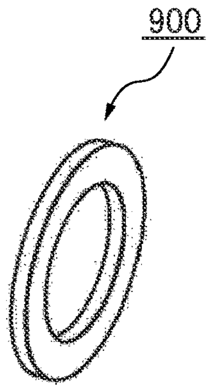
FIGS. 17A to 17D are diagrams for describing an example of a configuration of a light shielding sheet according to the fourth embodiment.
Figure 17B:
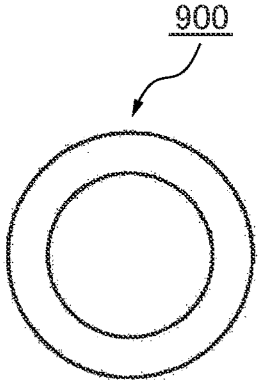
Figure 17C:
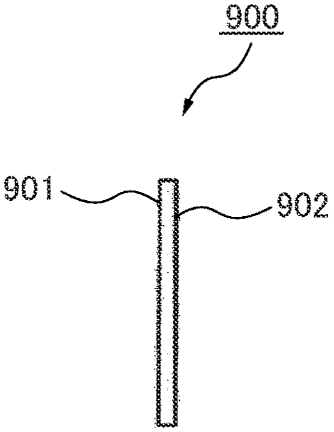
Figure 17D:
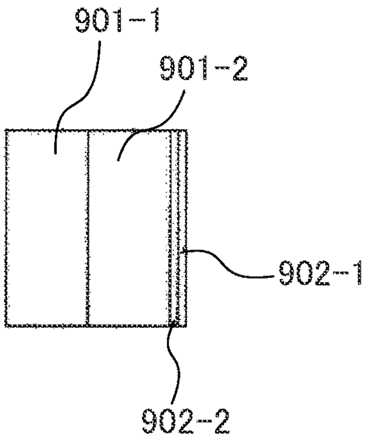

Hereinbelow, the light shielding sheet 900 will be described. FIGS. 17A to 17D are diagrams for describing an example of a configuration of the light shielding sheet 900. FIG. 17A is a perspective view of the light shielding sheet 900, FIG. 17B is a plan view of the light shielding sheet 900, FIG. 17C is a side view of the light shielding sheet 900, and FIG. 17D is a cross-sectional view of the light shielding sheet 900.

As shown in FIGS. 17A and 17B, the light shielding sheet 900 is formed in a ring shape, and is disposed so that the arm 15 will pass through the inside of the ring with no gap therebetween. As shown in FIG. 17C, the light shielding sheet 900 includes a single-sided PET sheet attached cushion material 901 and a light shielding tape 902. It should be noted that PET is an abbreviation for polyethylene terephthalate.

Further, as shown in FIG. 17D, the single-sided PET sheet attached cushion material 901 includes a PET film 901-1 and a polyurethane foam 901-2. Also, the light shielding tape 902 includes a black polyester film 902-1 and a black acrylic adhesive 902-2, and is attached to the single-sided PET sheet attached cushion material 901 by the adhesive force of the black acrylic adhesive 902-2.

It should be noted that, since a portion of the lighting unit 11 to which the arm 15 is attached is a movable portion, smooth movement is required. Also, the light shielding sheet 900 arranged at the attachment portion of the arm 15 is arranged in a state of being sandwiched between the inner surface of the housing of the lighting unit 11 and the connection portion of the tip end of the arm 15. Therefore, by making the surface of the black polyester film 902-1 of the light shielding sheet 900 smooth and enhancing the slidability, smoother movement can be achieved. Further, the light shielding tapes 902 having high slidability may be attached to both the surfaces of the single-sided PET sheet attached cushion material 901 to further enhance the slidability and the light shielding property. That is, the light shielding sheet 900 may include the cushion material 901 and sheets (light shielding tapes 902) having higher slidability than the cushion material 901 attached to both the surfaces of the cushion material 901.

In this manner, by attaching the ring-shaped light shielding sheet 900, which can be curved along the inner surface of the housing of the lighting unit 11 and into which the arm 15 can be inserted with no gap therebetween, along the inner surface of the housing of the lighting unit 11, to the attachment position of the arm 15 on the inner surface of the housing, it is possible to prevent light of the light emitting unit inside the lighting unit 11 from leaking from the attachment portion of the arm 15.

It should be noted that the lighting-equipped loudspeaker 1 according to the present embodiment has a configuration in which the arm 15 for changing the position and the irradiation angle of the lighting unit 11 is connected to the battery unit 13 and the lighting unit 11, and the arm 15 is away from the loudspeaker unit 12 (not in contact with the loudspeaker unit 12). That is, for example, the U-shaped arm 15 does not contact the loudspeaker unit 12 and has one end turnably supported by the battery unit 13 and the other end turnably support the lighting unit 11. This can prevent the vibration of the loudspeaker unit 12 from being transmitted to the lighting unit 11 via the arm 15 and causing flickering or the like. In particular, in a case where the lighting unit 11 includes a camera or a microphone, vibration transmitted to the lighting unit 11 may affect the image quality of an image shot by the camera or the sound quality of a sound input into the microphone. However, the present embodiment can suppress the influence of the vibration on the image quality and the sound quality.

As described above, it is possible to provide an easy-to-use lighting-equipped loudspeaker that can be used not only as a wireless loudspeaker but also as a lighting device at the time of reading or the like by illuminating an arbitrary place that the user wishes to be illuminated, that is portable, and that has both the maintenance of the posture of the desk-lamp-type lighting device and the operability enabling easy movement with one hand without the need for support of the apparatus. In this manner, it is possible to provide a high-performance and flexible lighting-equipped loudspeaker apparatus usable in various scenes so as to be used to illuminate an arbitrary place that the user wishes to be illuminated or to reproduce a high-quality sound source or voice.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-211330, filed on Dec. 24, 2021, the benefit of Japanese Patent Application No. 2022-125555, filed on Aug. 5, 2022, and the benefit of Japanese Patent Application No. 2022-125556, filed on Aug. 5, 2022, and the benefit of Japanese Patent Application No. 2022-190372, filed on Nov. 29, 2022, which are hereby incorporated by reference herein in their entirety.

What is claimed is:

1. A loudspeaker apparatus comprising:

a first unit including a loudspeaker therein; and a second unit connected to a bottom of the first unit, wherein the first unit comprises:

the loudspeaker provided in a housing of the first unit so as to output a sound toward an upper portion of the housing; and a passive radiator provided on a bottom side of the loudspeaker in the housing, and wherein an output port of the passive radiator faces an inclined surface which is provided at an upper portion of the second unit and whose distance from the output port of the passive radiator increases toward a radially outer side of the housing.

2. The loudspeaker apparatus according to claim 1, wherein an upper surface of the second unit facing the passive radiator is made of metal.

3. The loudspeaker apparatus according to claim 1, wherein a sound absorbing material is provided between the loudspeaker and the passive radiator in the housing, a substrate formed in a cut-out circular shape is provided between the sound absorbing material and the passive radiator in the housing, and the sound absorbing material forms a gap between a periphery thereof and an inner surface of the housing, and spaces existing between the loudspeaker and the passive radiator linearly communicate with each other through the gap.

4. The loudspeaker apparatus according to claim 3, wherein a wireless module is attached to the cut-out portion of the substrate.

5. The loudspeaker apparatus according to claim 1, wherein a frame body is provided between the loudspeaker and the passive radiator in the housing, and a substrate is attached to the frame body so that a surface of the substrate is parallel to a direction from the loudspeaker toward the passive radiator to form a sound passage between the loudspeaker and the passive radiator.

6. The loudspeaker apparatus according to claim 5, wherein a sound absorbing material is attached to the frame body, and the sound absorbing material is disposed so as to sandwich the frame body between the sound absorbing material and the substrate.

7. The loudspeaker apparatus according to claim 5, wherein a wireless module is attached to the substrate, and a part of the wireless module is exposed to the sound passage.

8. A loudspeaker apparatus comprising:

a first unit including a loudspeaker therein; and a second unit connected to a lower portion of the first unit, wherein the first unit comprises:

the loudspeaker provided in a housing of the first unit so as to output a sound toward an upper portion of the housing; and a passive radiator provided on a rear surface side of the loudspeaker in the housing, and wherein an output port of the passive radiator is opposed to an inclined surface which is provided at an upper portion of the second unit and whose distance from the output port of the passive radiator increases toward a radially outer side of the housing, wherein a sound absorbing material is provided between the loudspeaker and the passive radiator in the housing, a substrate formed in a cut-out circular shape is provided between the sound absorbing material and the passive radiator in the housing, and the sound absorbing material forms a gap between a periphery thereof and an inner surface of the housing, and spaces existing between the loudspeaker and the passive radiator linearly communicate with each other through the gap, and wherein a support member made of resin that supports the sound absorbing material is provided between the sound absorbing material and the substrate in the housing, a predetermined electronic component is attached to the substrate on a side which the sound absorbing material faces, and the support member is in a shape having a step and is attached inside the housing so as for the predetermined electronic component to be housed in a space created by the step.

* * * * *